United States Patent [19]

Moore et al.

[11] Patent Number: 4,686,741
[45] Date of Patent: Aug. 18, 1987

[54] PADDED AUTOMOTIVE CASKET HANDLE

[75] Inventors: Ronald D. Moore, Troy; James D. Kavanaugh, Dearborn; Richard A. Phelps, Ferndale; Michael C. Howard, Mt. Clemens, all of Mich.

[73] Assignee: Chivas Products Limited, Sterling Heights, Mich.

[21] Appl. No.: 834,005

[22] Filed: Feb. 27, 1986

[51] Int. Cl.$^4$ .............................................. E05B 5/02
[52] U.S. Cl. ..................... 16/112; 16/116 R; 16/126; 16/DIG. 18; 49/460
[58] Field of Search ............... 16/110 R, 112, 116 R, 16/119, 124, 126, 127, DIG. 12, DIG. 18, DIG. 24; 296/71; 105/354; 312/320; 297/183; 27/1, 2, 27; 49/460, 502; 190/39, 115, 117

[56] References Cited

U.S. PATENT DOCUMENTS

| | | | |
|---|---|---|---|
| 3,110,377 | 11/1963 | Eisenmann | 16/126 |
| 3,183,549 | 5/1965 | Hammesfahr | 16/125 |
| 3,952,383 | 4/1976 | Moore et al. | 24/265 R X |
| 3,977,054 | 8/1976 | Moore et al. | 16/110 R X |
| 3,995,349 | 12/1976 | Roberts et al. | 16/125 |
| 4,016,315 | 4/1977 | Szabo | 16/116 R X |
| 4,067,602 | 1/1978 | Ahlisch et al. | 296/71 |
| 4,087,141 | 5/1978 | Roberts | 312/320 |
| 4,261,078 | 4/1981 | Edwards et al. | 190/39 X |
| 4,356,592 | 11/1982 | Moore | 16/125 |
| 4,357,734 | 11/1982 | Moore | 16/125 |
| 4,364,150 | 12/1982 | Remington | 16/126 |

FOREIGN PATENT DOCUMENTS

| | | | |
|---|---|---|---|
| 1176012 | 8/1964 | Fed. Rep. of Germany | |
| 1779991 | 4/1973 | Fed. Rep. of Germany | |
| 828420 | 2/1960 | United Kingdom | |
| 1186527 | 4/1970 | United Kingdom | 190/115 |

Primary Examiner—Fred Silverberg
Attorney, Agent, or Firm—Townsend and Townsend

[57] ABSTRACT

An automotive casket handle includes a generally U-shaped frame, pivotally mounted to a support surface, and inside and outside cushion members secured to recesses in the frame. Each cushion member includes a structural strip, typically of steel, a cover, typically of preformed vinyl, and a foam strip positioned between the structural strip and the cover. The edges of the cover are captured between the structural strip and the frame. Thus, the exposed surface of the cover is smooth and seamless with rounded edges. One cushion member is secured to the frame by bendable tabs extending from the structural strip, passing through tab openings in the frame and then bent against the frame. The other cushion member is connected to the frame by the engagement of studs, extending from the structural strip, into push lock fasteners mounted to the frame.

5 Claims, 5 Drawing Figures

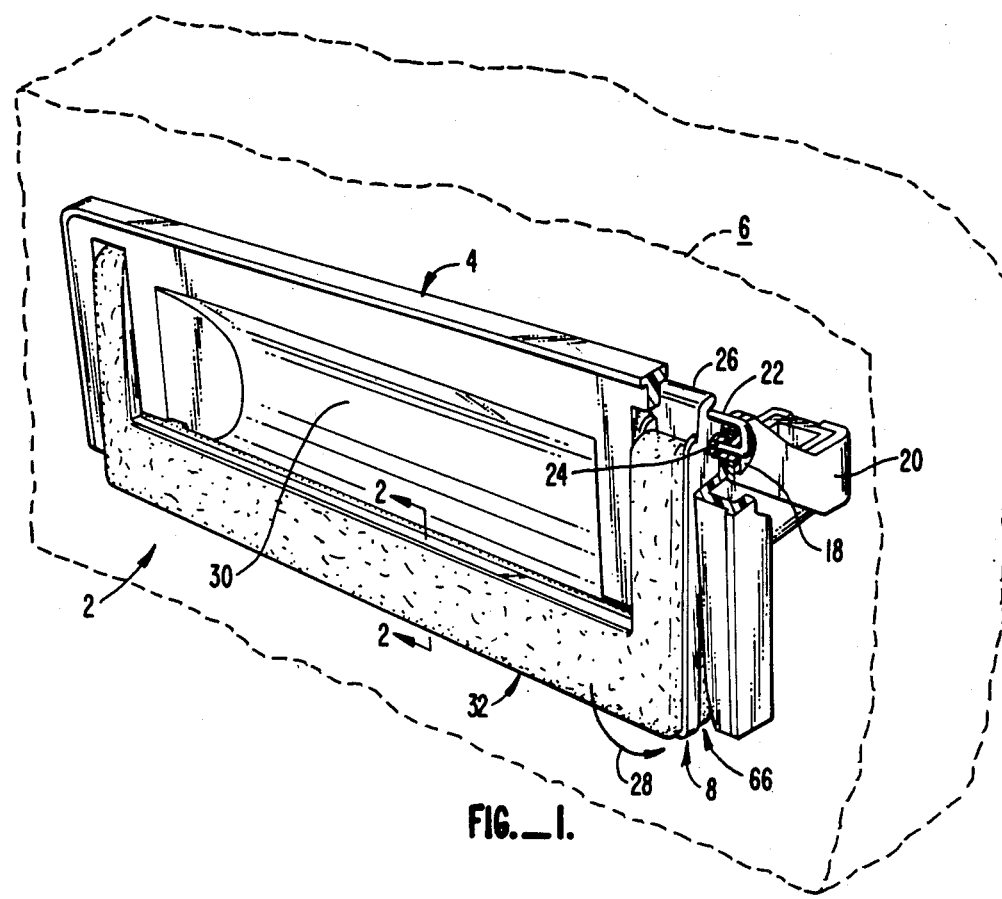
FIG.___1.
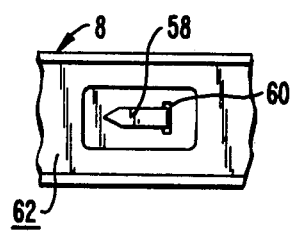
FIG.___5.
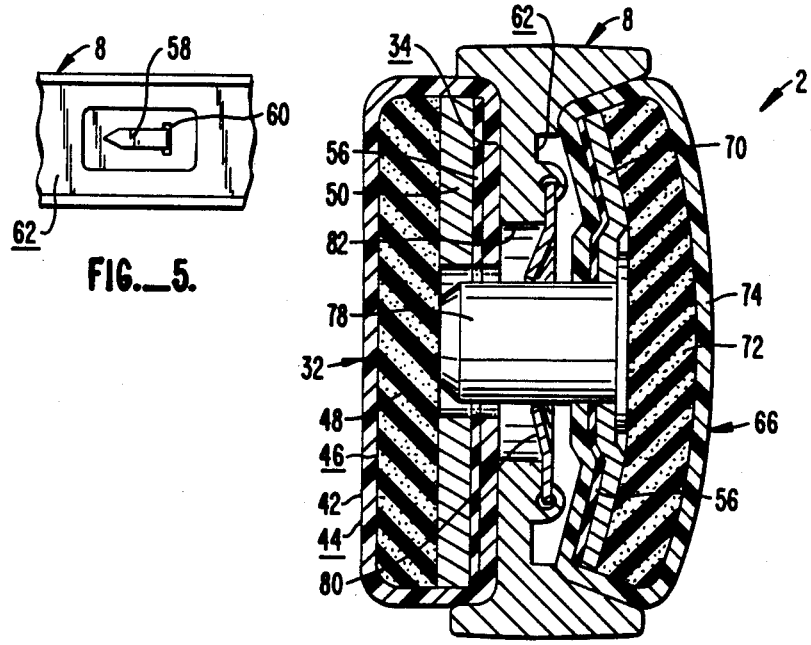
FIG.___2.

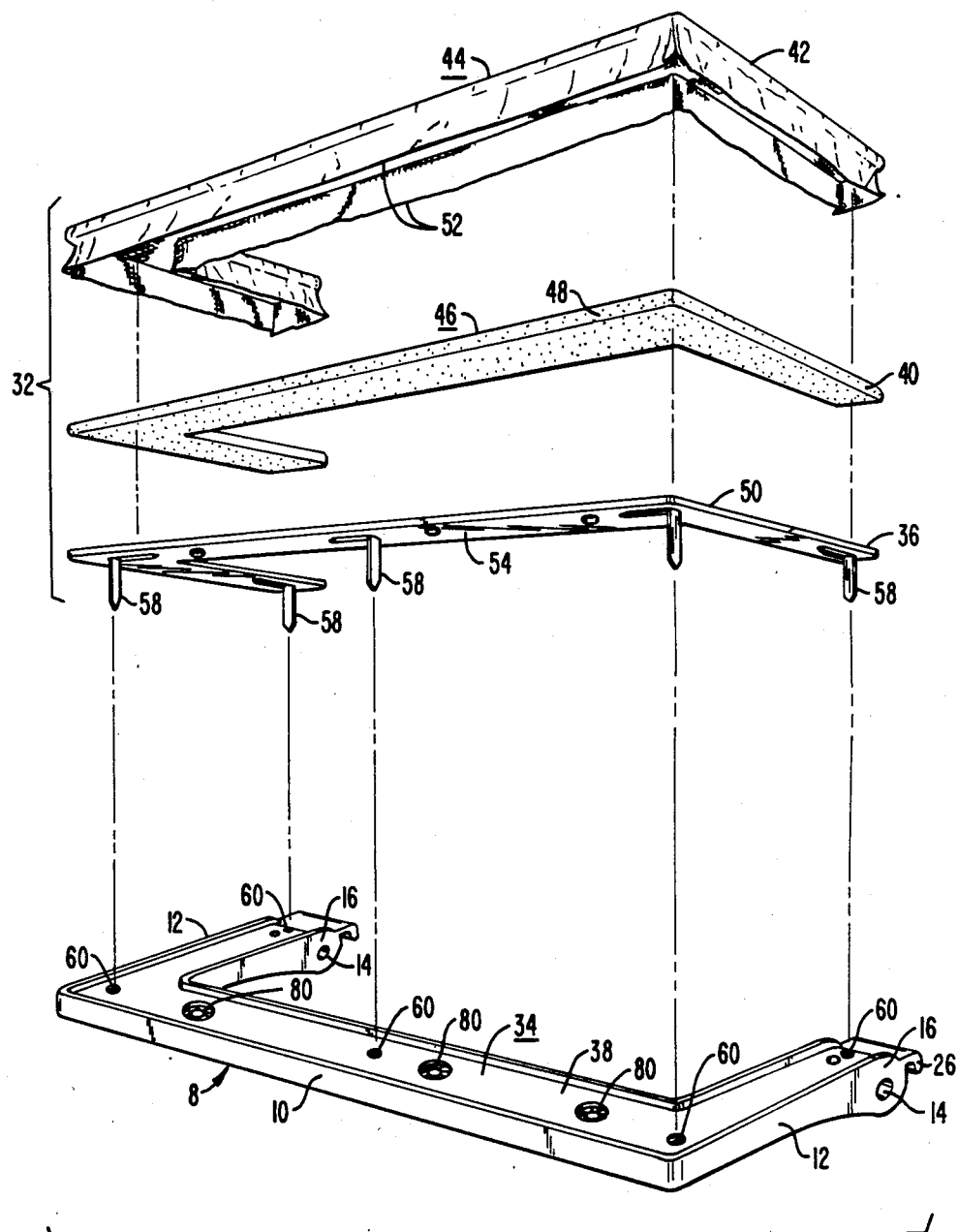
FIG._3.

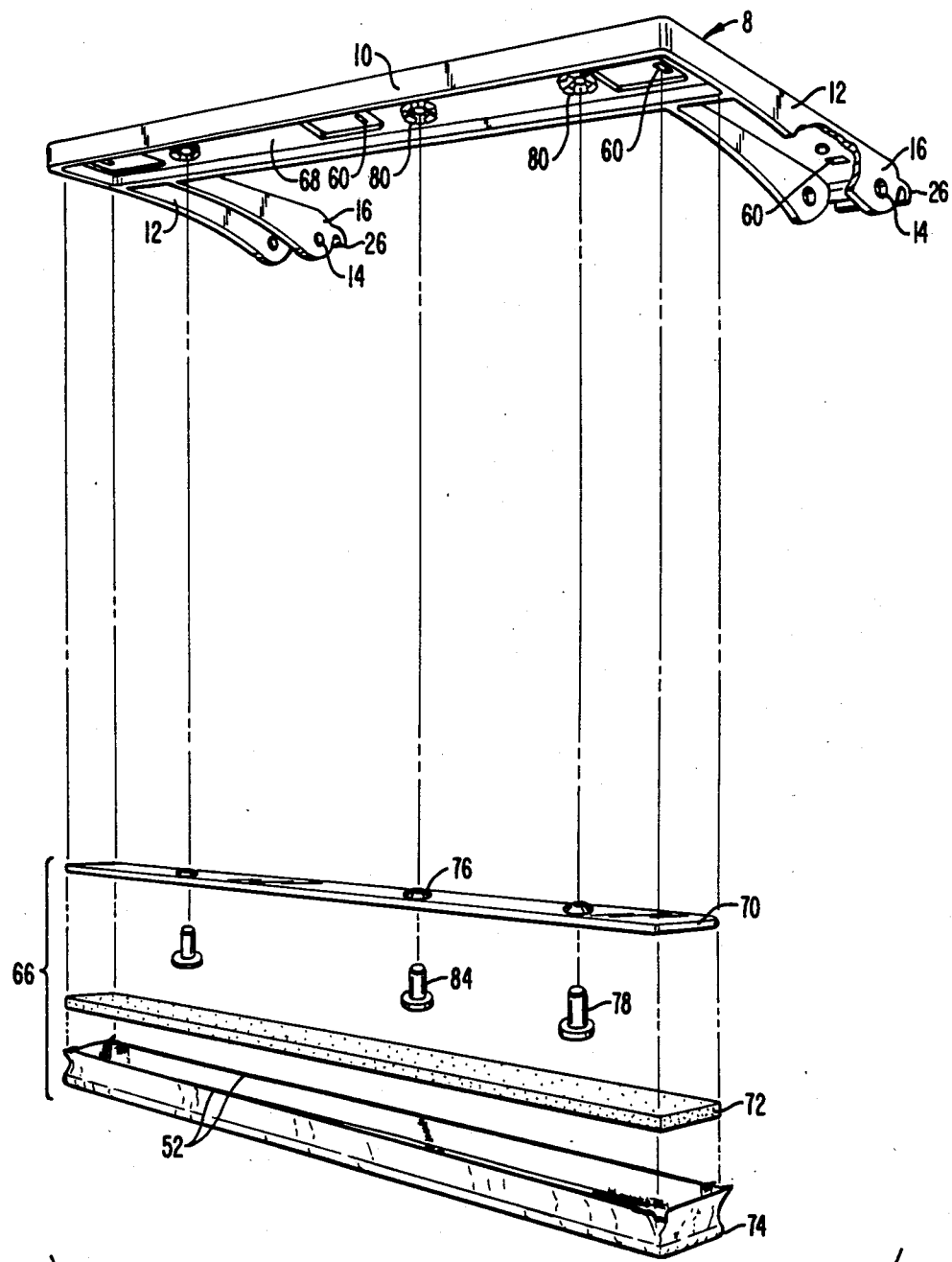
FIG._4.

PADDED AUTOMOTIVE CASKET HANDLE

BACKGROUND OF THE INVENTION

Automotive vehicles, including automobiles, trucks, recreational vehicles and so forth, are considered by some users simply as a means to go from point A to point B. Other owners of automotive vehicles, for a variety of reasons, want a certain degree of luxury in their vehicles. One way this is accomplished is by the judicious use of padding within the vehicle interior. For some elements, such as dashboards, padding acts as both an aesthetic feature and safety feature. Other padded areas, such as inside door panels, are padded primarily for aesthetic reasons.

In a certain class of vehicles the use of door pullstraps on the inside surface of the door has become popular. These pullstraps have become popular in part because they intrude just a short distance into the interior of the vehicle while providing the user a firm and secure hand hold for closing the door. These pullstraps have been made padded for both aesthetic reasons and for the comfort of the user. One way to do so is to construct the strap having a flexible steel strip as a base and at least partially covering the steel strip with a padding material, typically a soft foam. This is wrapped with a vinyl covering so that the edges of the vinyl covering overlap at the side of the strap facing the interior of the vehicle. The exposed vinyl edge is covered by a decorative strip so to mask the seam. This provides an attractive structure which is comfortable to use and producible at a reasonable cost. See U.S. Pat. No. 3,977,054 for an example of such a pullstrap.

Although this method of manufacture works well for pullstraps, it has not been adaptable to what is termed in this application as casket handles. Casket handles have a U-shape with an elongate base and parallel legs. The handle is pivotally mounted to a support surface, typically an inside door panel, at the distal ends of the legs. The support surface is often configured so that when the handle is lying against the support surface it is generally flush with the support surface. Casket handles are often preferred over other types of hardware because they need not intrude into the passenger compartment when not in use.

Thus what is missing in the art is a padded casket handle which can be manufactured in mass quantities at reasonable cost and provide years of trouble-free use for the user.

SUMMARY OF THE INVENTION

The present invention is directed to a casket handle suitable for automotive use in which the outer surface, or both the outer and inner surfaces, are padded with a seamless cushion surface. The handle made according to the invention can be manufactured quickly at reasonable cost in mass quantities and is designed to provide the user with a long life.

The automotive casket handle of the invention includes a generally U-shaped frame having an elongate base and first and second legs. The frame is pivotally mounted to a support surface at the distal ends of the legs. The handle is preferably spring-biased to a retracted or lowered position so to be generally flush with the support surface when not in use.

The handle includes inside and outside cushion members secured to recesses in the inside and outside frame surfaces. The cushion members include a structural strip, typically of steel, having a first side opposite the frame and a second side facing away from the frame. A foam strip is positioned against the second side of the structural strip and a cover, typically of preformed vinyl, is mounted over the foam strip and the structural strip. The edges of the cover are positioned against the first side of the structural strip and can be secured to the first side by a dielectric bonding process. Thus, the exposed surface of the outside cover is smooth and seamless since the edges of the outside cover are captured between the first side of the structural strip and the frame.

One of the cushion members can be secured to the frame through the use of bendable tabs extending from the first side of the structural strip; the tabs pass through tab openings formed in the frame and are bent over to lie against the frame. The other cushion member is simply connected to the frame through the use of rivets or other studs extending from the inside structural strip. The rivets engage push lock fasteners mounted to the frame at suitable positions so that merely forcing the cushion member against the frame surface securely mounts the cushion member to the frame.

One of the primary advantages of the invention is the ability to provide padded, cushioned surfaces for the handle having no seams and substantially no creases. Thus, the exposed padded surfaces are smooth with rounded corners and substantially no creases. This is aided in part by the use of a vacuum formed cover, preferably preformed, to fit over the foam and structural strips. The use of recesses in the frame to partially house the cushion members also helps to conceal any wrinkles, folds, or edges in the cover which could otherwise be exposed to view.

Another important aspect of the invention is the method for securing the cushion members to the frame. The use of punched out tabs, called toy tabs, in the structural strip of one of the cushion members is an extremely inexpensive way to create a fastener. The tabs are positioned to pass through tab openings in the frame and then bent over to secure the cushion member to the frame. Thus, the cost for the mounting structure for this cushion member is virtually nil; the process of bending over the tabs to secure the cushion member to the frame is extremely simple as well. The other cushion member cannot be mounted in the same fashion because of the lack of ready access to the tabs. Therefore, according to another aspect of the invention the structural strip for that cushion member has at least one, and preferably more, posts, rivets or other stud-like members extending from the strip towards the frame. The push lock fasteners mounted to the frame securely engage the shaft of the rivet as the cushion member is mounted to the frame. Although the cost of the mounting hardware for this cushion member is somewhat greater than that for the other cushion member, the method of attachment which occurs when the cushion member is simply pressed against the frame is even simpler than with the tab fasteners.

Other features and advantages of the invention will appear from the following description in which the preferred embodiment has been set forth in detail in conjunction with the accompanying drawings.

BRIEF DESCRIPTION OF THE DRAWINGS

FIG. 1 is a perspective view showing a handle made according to the invention mounted to a handle housing along a support surface, the support surface shown in dashed lines.

FIG. 2 is an enlarged cross-sectional view of the handle of FIG. 1 taken along line 2—2.

FIG. 3 is an exploded perspective view of the frame and inside cushion member of the handle of FIG. 1.

FIG. 4 is an exploded perspective view of the frame and outside cushion member of the handle of FIG. 1.

FIG. 5 is a fragmentary view of the outside frame surface showing a bent-over tab after the inside cushion member has been mounted to the frame.

DETAILED DESCRIPTION OF THE PREFERRED EMBODIMENT

Referring now to FIG. 1, a padded casket handle 2 is shown mounted to a flush mounting handle housing 4 at a support surface 6, shown in dashed lines. Support surface 6 is typically the inside surface of a door panel for an automotive vehicle.

Referring also to FIGS. 2 and 3, handle 2 is seen to include a generally U-shaped frame 8, typically a zinc die casting, having an elongate base 10 and a pair of parallel legs 12. Legs 12 have bores 14 at the distal ends 16 for the pivotal mounting of handle 2 to handle housing 4 as shown in FIG. 1. Specifically, a hollow sleeve 18 passes through openings in a mounting bracket 20 and bores 14 so to pivotally secure handle 2 to handle housing 4. A spring 22 has an end 24 which passes through the central bore of sleeve 18. Spring 22 engages a lip 26 at distal end 16 to bias handle 2 in the direction of arrow 28 of FIG. 1 towards its recessed or non-operational position. Handle housing 4 also includes an opening 30 to allow the user to grasp handle 2.

Handle 2 includes an inside cushion member 32 secured to an inside surface 34 of frame 8. Member 32 includes a generally U-shaped inside structural strip 36 typically made of steel, sized to fit within an inside recess 38 formed along inside surface 34. An inside foam strip 40 is positioned between inside structural strip 36 and a vinyl covered cloth inside cover 42. Cover 42 is deformed so that the exposed inside cover surface 44 has a surface contour with no seams and substantially no wrinkles or folds as it covers the inside surface 46 of foam strip 40, circumferential edge 48 of strip 40 and circumferential edge 50 of structural strip 36. This leaves the edges 52 of inside cover 42 lying against first side 54 of inside structural strip 36. A PVC layer 56, shown in FIG. 2, is applied to first side 56 to allow cover 42 to be secured to first side 54 by a dielectric seal.

To secure inside cushion member 32 to frame 8, bendable tabs 58 are formed from inside structural strip 36. During assembly tabs 58 pass through tab opening 60 in frame 8 after which tabs 58 are bent over to lie against the outside frame surface 62, see FIG. 5. The preforming, typically by vacuum forming, of inside cover 42 helps to provide exposed cushion member 32 with a smooth surface, rounded corners and no exposed seams. Mounting inside cushion member 32 within inside recess 38 also helps to keep any folds, creases or edges from view.

Referring now also to FIG. 4, handle 2 is shown to include an outside cushion member 66 secured to outside frame surface 62 within an outside recess 68. Structurally, outside cushion member 66 is similar to inside cushion member 32 in that it includes an outside structural strip 70 having a first side 71 facing frame 8, an outside foam strip 72 and an outside cover 74. Outside cushion member 66 is sized, however, to extend only along base 10 of frame 8 while inside cushion member 32 extends along base 10 and along legs 12 of frame 8. In addition, the structure for mounting cushion member 66 to frame 8 differs from inside cushion member 32. Outside structural strip 70 has a number of slightly recessed openings 76 sized to accommodate straight shanked rivets 78. Push lock fasteners 80 are mounted to frame 8, such as by staking, at through holes 82, see FIG. 2, in frame 8. Fasteners 80 are adapted to allow shanks 84 of rivet 78 to enter fasteners 80 but prevent their removal.

In use, inside and outside covers 42, 74 are preferably preformed using suitable heat and vacuum to obtain the preformed shapes of FIGS. 3 and 4. Inside and outside covers 42, 74, foam strips 40, 72 and structural strips 36, 70 are then mounted one to the other with the outer cover edges 52 secured to the first sides 54, 71 by a dielectric bonding process using PVC layers 56. Inside cushion member 32, once assembled, is mounted to frame 8 by first passing tabs 58 through tab openings 60 and secured thereto by bending tabs 58 or against outside frame surface 62. Then outside cushion member 66 is mounted to outside frame surface 62 by directing shanks 84 of rivets 78 into push lock fasteners 80. Handle 2 is then mounted to handle housing 4 by passing sleeve 18 through openings in mounting brackets 20 and bores 14 at distal ends 16 of legs 12. To bias handle 2 towards it recessed, substantially flush position, a spring 22 is used to engage at least one lip 26 of one leg 12 to bias handle 2 in the direction of arrow 28.

The preferred embodiment structural strips 36, 70 are shown generally coextensive with their associated foam strips and covers. In some circumstances it may be possible or desirable to use a number of separate structural elements in lieu of continuous structural strips 36, 70. Also, instead of preforming the covers, they could be formed during their assembly with the foam and structural strips.

Other modification and variation can be made to disclosed embodiment without departing from the subject of the invention is defined in the following claims.

We claim:

1. A padded casket-type automotive handle, for mounting to a generally vertical support surface, comprising:

a generally U-shaped frame having an elongate base and legs, the frame pivotally mounted to the support surface at the distal ends of the legs, the frame having an outside surface facing the support and an inside surface facing away from the support surface;

an outside cushion member;

outside means for mounting the outside cushion member to the outside surface of the frame;

an inside cushion member;

inside means for mounting the inside cushion member to the inside surface of the frame;

a selected one of the outside and inside mounting means including:
    a first mounting element extending from the selected cushion member; and
    a second mounting element, engageable with the first mounting element, mounted to the frame, at least one of the first and second mounting elements being deflectable;

the other of the outside and inside mounting means including:

a mounting post extending from the other cushion member; and a push lock fastener secured to the frame and positioned for receipt of the mounting post;

the outside and inside cushion members including outside and inside cushion cores and outside and inside covers covering the outside and inside cushion cores, the covers having seamless, smooth exposed surfaces and edges; and the base including outside and inside recesses formed in the outside and inside surface sized to partially house the outside and inside cushion members, respectively.

2. The handle of claim 1 wherein the first mounting element includes a bendable tab and the second mounting element includes a tab opening formed in the frame for receipt of the bendable tab.

3. The handle of claim 2 wherein the bendable tab includes bendable tabs and the mounting post and push lock fastener includes mounting posts and push lock fasteners.

4. The handle of claim 1 wherein the outside and inside cushion members include outside and inside structural members.

5. The handle of claim 4 wherein the outside and inside structural members are generally coextensive with the outside and inside cushion covers.

* * * * *